US012654622B2

(12) United States Patent
Izukawa et al.

(10) Patent No.: US 12,654,622 B2
(45) Date of Patent: Jun. 16, 2026

(54) LUGGAGE HOOK

(71) Applicant: TOYOTA BOSHOKU KABUSHIKI KAISHA, Aichi-ken (JP)

(72) Inventors: Hideyuki Izukawa, Aichi-ken (JP); Iwao Matsushima, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 214 days.

(21) Appl. No.: 18/127,207

(22) Filed: Mar. 28, 2023

(65) Prior Publication Data

US 2023/0365066 A1 Nov. 16, 2023

(30) Foreign Application Priority Data

May 13, 2022 (JP) ................................. 2022-079283

(51) Int. Cl.
| | |
|---|---|
| *B60R 7/04* | (2006.01) |
| *B60N 3/02* | (2006.01) |
| *B60R 7/10* | (2006.01) |
| *B60N 2/90* | (2018.01) |

(52) U.S. Cl.
CPC .............. *B60R 7/043* (2013.01); *B60N 3/023* (2013.01); *B60R 7/10* (2013.01); *B60N 2002/905* (2018.02)

(58) Field of Classification Search
CPC ......... B60R 7/10; B60R 7/043; A47G 25/065; A47G 25/0642; B60N 3/023; B60N 2002/905
See application file for complete search history.

(56) References Cited

U.S. PATENT DOCUMENTS

| | | | |
|---|---|---|---|
| 7,669,821 B2 * | 3/2010 | Martin ...................... | B60R 7/08 |
| | | | 248/306 |
| 9,016,642 B1 * | 4/2015 | Ay .......................... | F16B 45/00 |
| | | | 248/205.1 |
| 10,065,565 B2 | 9/2018 | Mozurkewich et al. | |

(Continued)

FOREIGN PATENT DOCUMENTS

| | | | | |
|---|---|---|---|---|
| JP | 2000-158992 | 6/2000 | | |
| JP | 2002234372 A | * 8/2002 | ............. | B60N 3/026 |

(Continued)

OTHER PUBLICATIONS

Machine translation of JP 2013-064500 to Miyamae; Hitoshi; published Apr. 11, 2013. (Year: 2013).*

(Continued)

*Primary Examiner* — Daniel J Colilla
(74) *Attorney, Agent, or Firm* — Greenblum & Bernstein, P.L.C.

(57) ABSTRACT

A luggage hook provided in an interior portion of a vehicle includes a hook configured to be coupled to the interior portion so as to be rotatable about an axis extending in a lateral direction of the vehicle, a bezel including a frame configured to be fixed to the interior portion and to be attached around the hook, and a metal stopping portion joined to the frame of the interior portion and configured to, at a use position, stop rotation of the hook in a deployment direction protruding from the bezel. A direction in which the rotation of the hook is stopped by the stopping portion is the same as a rotation direction in which the hook is pressed about the axis as an object is hooked at the use position.

6 Claims, 11 Drawing Sheets

(56) References Cited

U.S. PATENT DOCUMENTS

| | | | | | |
|---|---|---|---|---|---|
| 2003/0141423 | A1* | 7/2003 | Gordon | ..................... | B60R 7/10 |
| | | | | | 224/313 |
| 2004/0163223 | A1* | 8/2004 | Bivens | ..................... | B60R 7/10 |
| | | | | | 24/582.1 |
| 2010/0077571 | A1 | 4/2010 | Nemoto | | |
| 2017/0265666 | A1 | 9/2017 | Sotome | | |

FOREIGN PATENT DOCUMENTS

| | | |
|---|---|---|
| JP | 2010-168028 | 8/2010 |
| JP | 2013-64500 | 4/2013 |
| JP | 2014-94638 | 5/2014 |
| JP | 2016/088695 | 8/2017 |
| JP | 2017/094575 | 8/2018 |

OTHER PUBLICATIONS

Office Action issued in Japan Patent Application No. 2022-079283, dated Jun. 24, 2025, together with English translation thereof.
Office Action issued in Japan Patent Application No. 2022-079283, dated Sep. 9, 2025, together with English translation thereof.
Office Action issued in China Patent Application No. 202310506630.5, dated Feb. 6, 2026, together with English translation thereof.

* cited by examiner

LUGGAGE HOOK

CROSS-REFERENCE TO RELATED APPLICATION

This application is based on Japanese Patent Application No. 2022-079283 filed on May 13, 2022, the entire contents of which are incorporated herein by reference.

TECHNICAL FIELD

The present invention relates to a luggage hook. Specifically, the present invention relates to a luggage hook provided in an interior portion of a vehicle.

BACKGROUND ART

U.S. patent Ser. No. 10/065,565 discloses a configuration in which a back portion of a seat back of a vehicle seat is provided with a so-called convenience hook. The convenience hook includes a hook having a hook-like hooking portion, and a bezel serving as a frame attached around the hook. The hook can be slid from a retracted position where the hook is fitted into the frame of the bezel to be pulled out to a use position.

In U.S. patent Ser. No. 10/065,565, since a load is transmitted from the hook to the bezel when an object is placed on the hooking portion of the hook, a failure such as cracking or breakage may occur in the bezel. In view of the above, the present invention provides a luggage hook capable of improving load resistance.

SUMMARY OF INVENTION

In order to solve the above problems, a luggage hook of the present invention takes the following aspects.

(1) A luggage hook provided in an interior portion of a vehicle includes:

a hook configured to be coupled to the interior portion so as to be rotatable about an axis extending in a lateral direction of the vehicle;

a bezel including a frame configured to be fixed to the interior portion and to be attached around the hook; and a metal stopping portion joined to the frame of the interior portion and configured to, at a use position, stop rotation of the hook in a deployment direction protruding from the bezel.

In the luggage hook, a direction in which the rotation of the hook is stopped by the stopping portion is the same as a rotation direction in which the hook is pressed about the axis as an object is hooked at the use position.

(5) A luggage hook provided in an interior portion of a vehicle includes:

a hook configured to be coupled to the interior portion so as to be rotatable about an axis extending in a lateral direction of the vehicle and movable between a use position and a retracted position;

a metal stopping portion joined to the frame of the interior portion and configured to, at a use position, restrict rotation of the hook in a deployment direction along which the hook moves from the retracted position to the use position.

According to the aspects (1) and (5), the load acting on the hook due to the hooked object is received by the stopping portion coupled to the frame of the interior portion to stop the rotation of the hook. Accordingly, the load applied to the hook may be strongly received without applying a load to the bezel. As a result, the load resistance of the luggage hook may be enhanced.

(2) In the luggage hook of (1), the hook includes, at the use position:

a hooking portion protruding from the bezel and having a hook shape; and a closing portion forming a surface flush with the bezel to close an inside of the frame of the bezel.

According to the aspect (2), when the hook is deployed to the use position, the inside of the frame of the bezel may be appropriately closed with good appearance by the closing portion of the hook, which does not apply a load to the bezel.

(3) The luggage hook of (1) further includes:

a spring configured to bias the hook to rotate in the deployment direction with respect to the interior portion; and a rotary damper configured to damp rotation of the hook in the deployment direction with respect to the interior portion.

According to the aspect (3), the spring may hold the hook in an appropriately positioned state without rattling at the use position. In addition, the rotary damper may be deployed with good operational quality while appropriately damping the hook so that the hook is not excessively biased toward the use position.

(4) In the luggage hook of (1), the interior portion is an assist grip attached to a back portion of a seat back of a vehicle seat, and the frame is a fastening end of a body frame fastened to the back portion of the seat back of the assist grip.

According to the aspect (4), the luggage hook may be provided with a rational and excellent load resistance by utilizing the attachment structure of the assist grip attached to the back portion of the seat back.

DESCRIPTION OF EMBODIMENTS

Figure 1:
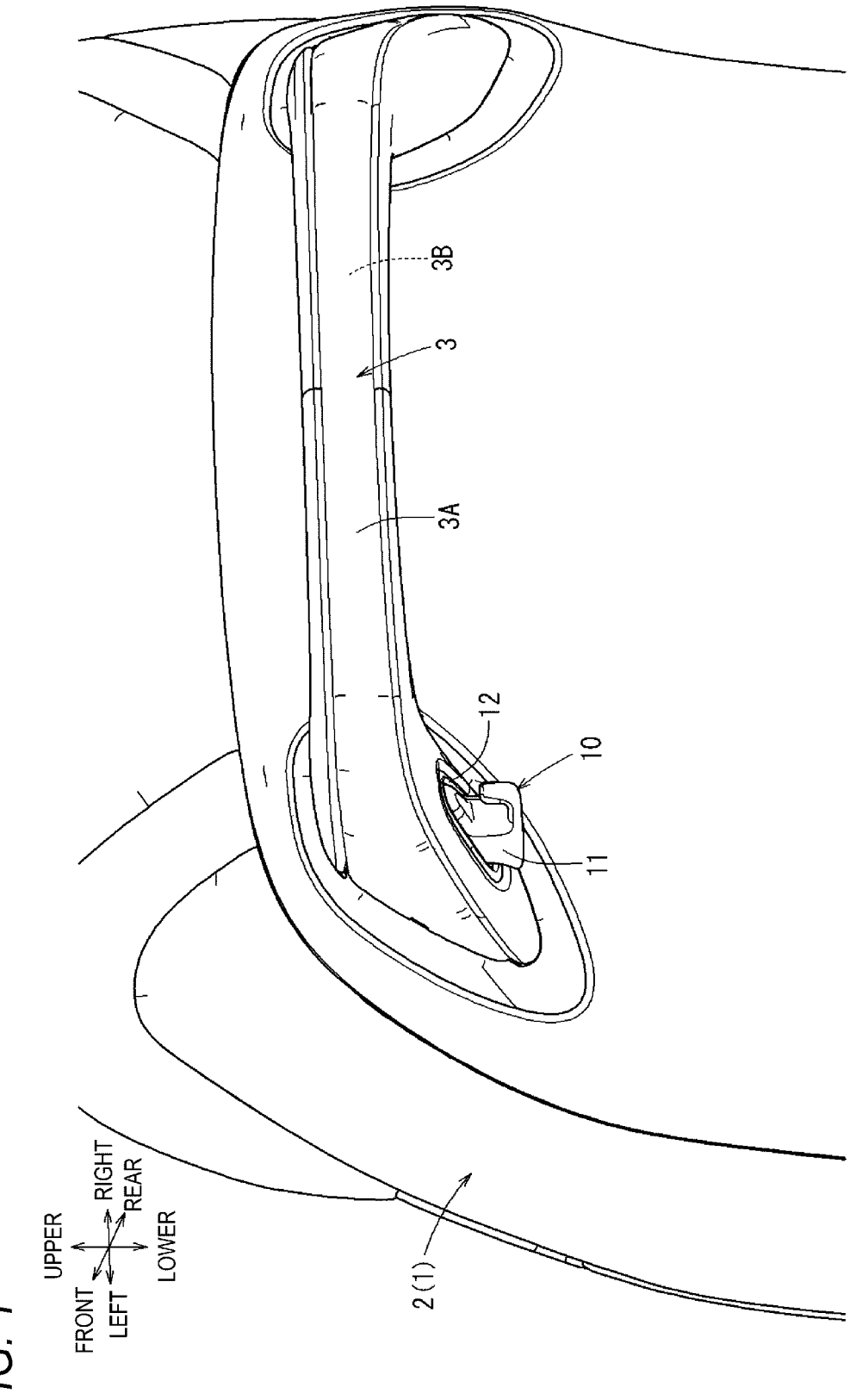
FIG. 1 is a perspective view illustrating a configuration of a seat including a luggage hook according to a first embodiment.

Embodiments of the present invention will be described below with reference to the drawings.

First Embodiment

First, a configuration of a luggage hook 10 according to a first embodiment of the present invention will be described with reference to FIGS. 1 to 11. In the following description, directions, such as front, rear, upper, lower, left, and right, indicate the respective directions shown in the drawings. A "seat width direction" indicates to a left-right direction of a seat (vehicle seat) 1 described later. In the following description, when no specific reference drawings are indicated or when no reference signs correspond to the reference drawings, any one of FIGS. 1 to 11 may be referred to as appropriate.

As illustrated in FIG. 1, the luggage hook 10 according to the present embodiment is configured as a so-called convenience hook provided on the back portion of a seat back 2 of a seat 1, which serves as a right seat of an automobile. Specifically, the luggage hook 10 is incorporated in the lower left portion of an assist grip 3 attached to the back portion of the seat back 2. Here, the assist grip 3 corresponds to the "interior portion" of the present invention.

Figure 2:
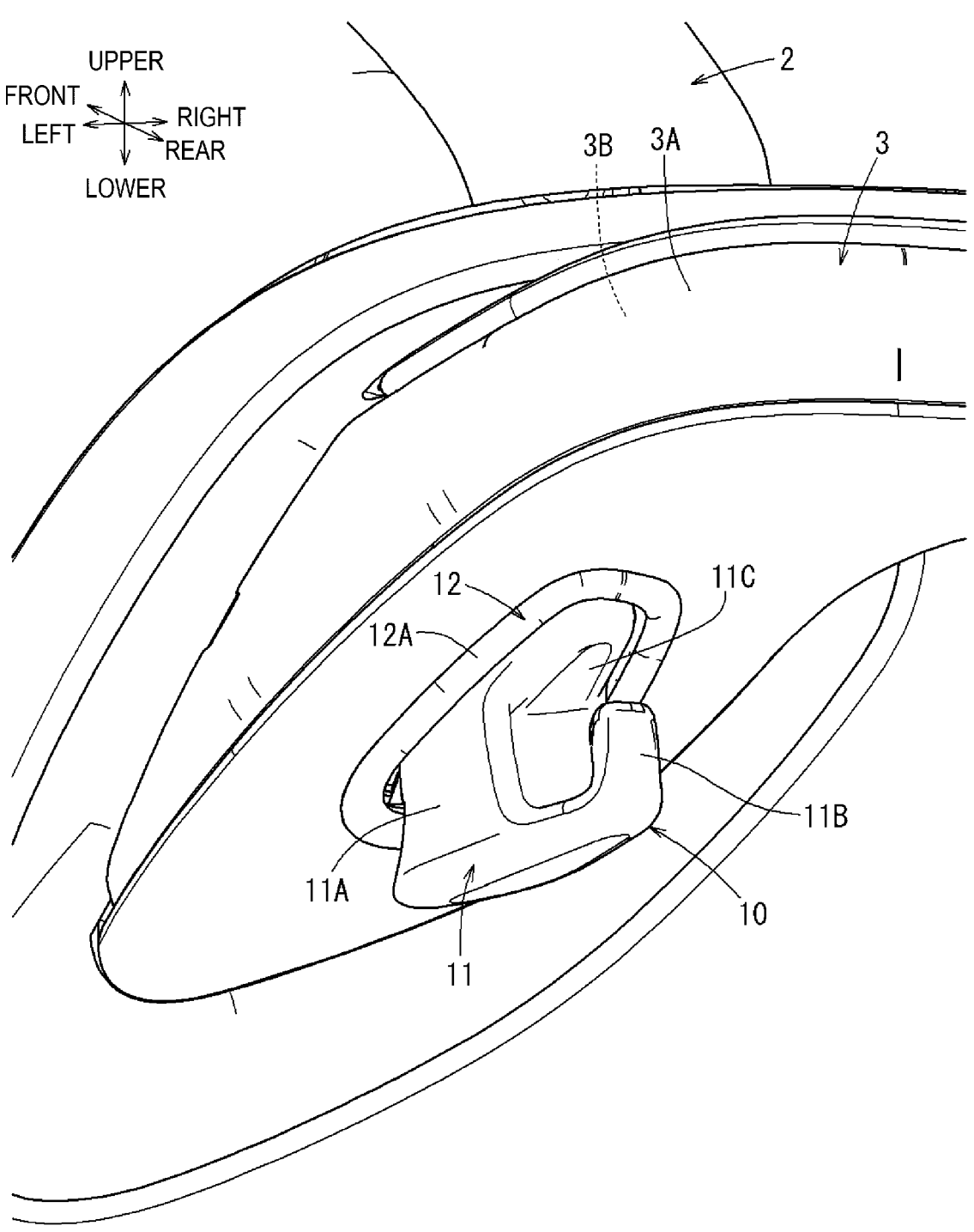
FIG. 2 is a perspective view illustrating a deployed state of the luggage hook.

As illustrated in FIG. 2, the luggage hook 10 includes a hook 11 having a hook-shaped hooking portion 11B, and a bezel 12 serving as a frame attached around the hook 11. The hook 11 is rotatably coupled to the assist grip 3. Accordingly, the hook 11 may be switched between a use position at which the hooking portion 11B protrudes from the bezel 12 toward the rear in the drawing and a retracted position (see FIG. 3) at which the hook 11 is retracted to be flush with the bezel 12.

Figure 3:
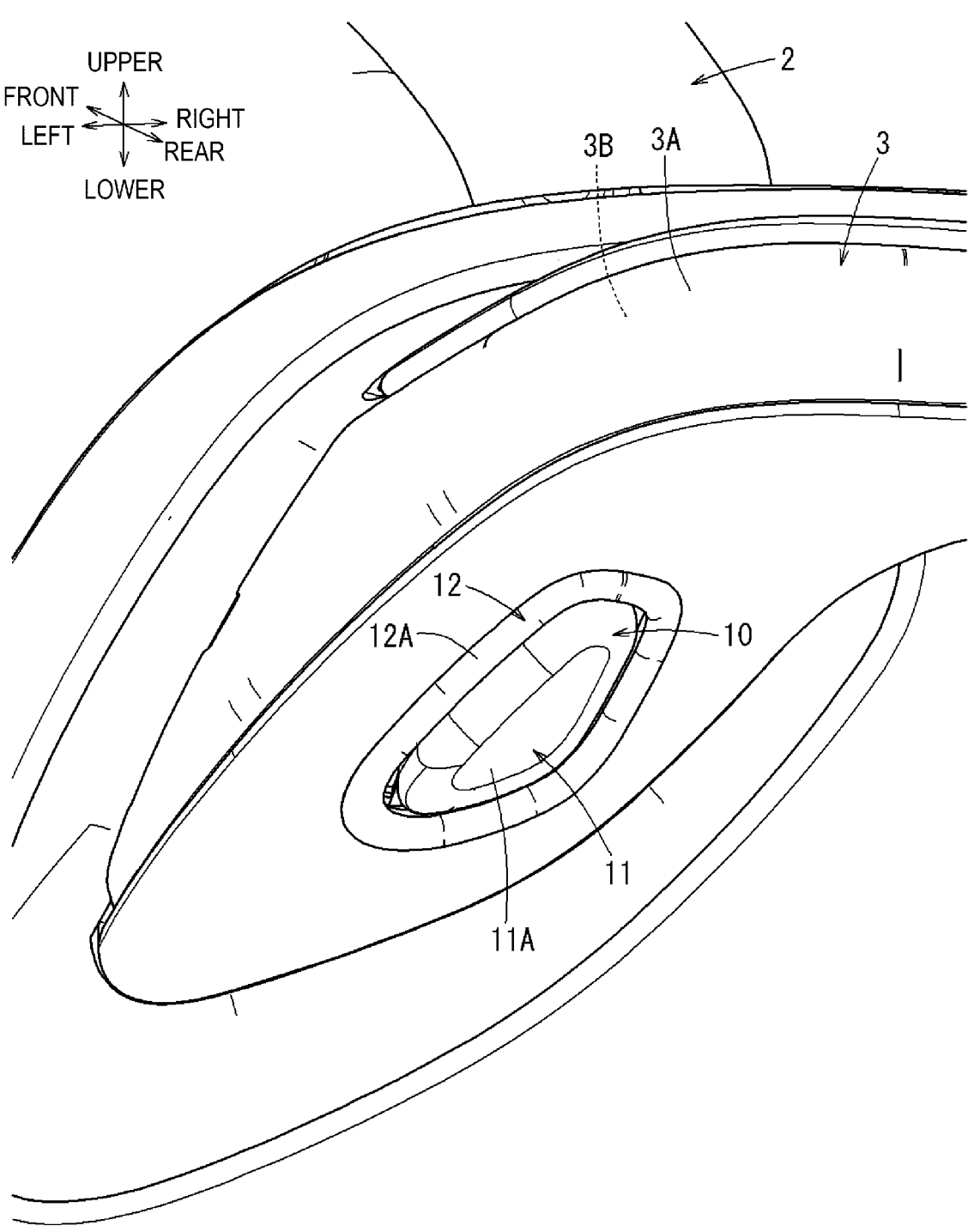
FIG. 3 is a perspective view illustrating a retracted state of the luggage hook.

Specifically, when the user presses the exposed surface of the hook 11 with a finger from the state in the retracted position illustrated in FIG. 3, the hook 11 is deployed to the use position illustrated in FIG. 2 by the biasing force. When the user pushes the hook 11 into the frame of the bezel 12 from the state in the use position illustrated in FIG. 2, the hook 11 is locked in the retracted position illustrated in FIG. 3 without being deployed. By repeating this operation, the hook 11 is alternately switched between the retracted position illustrated in FIG. 3 and the use position illustrated in FIG. 2.

Figure 4:
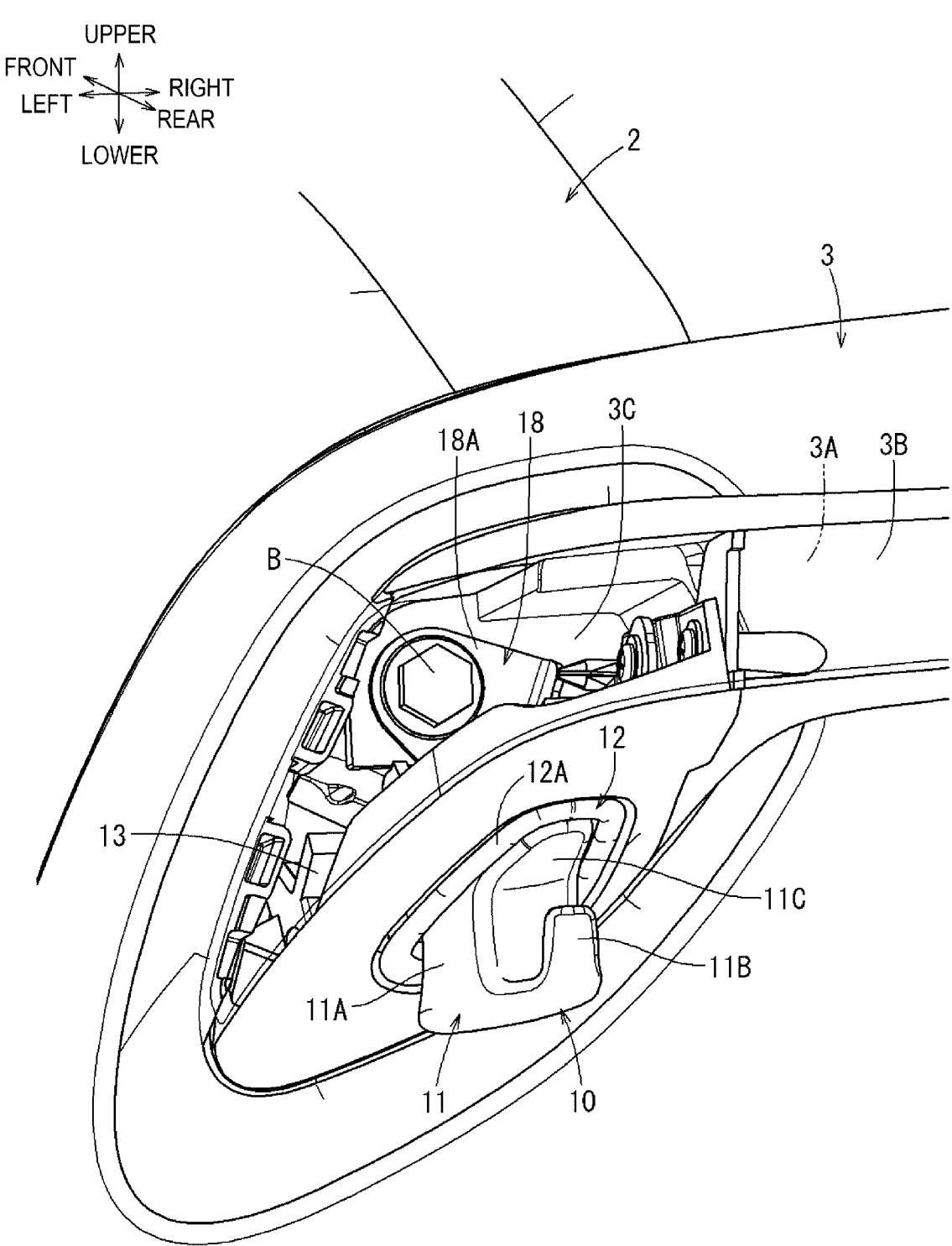
FIG. 4 is a perspective view illustrating an attached state of the luggage hook.

As illustrated in FIG. 4, the luggage hook 10 is incorporated into the assist grip 3. The assist grip 3 includes a grip body 3A serving as a grip portion, and a body frame 3B forming a laterally long skeleton along the grip body 3A. The grip body 3A has a shape whose central portion in the longitudinal direction serving as the grip portion thereof is curved rearward in the drawing with respect to both ends, thereby forming a bow shape. Both ends of the grip body 3A in the longitudinal direction are integrally fixed to the back portion of the seat back 2 from the rear side in the drawing. In FIG. 4, the rear side face of the grip body 3A is omitted for illustration purpose.

Specifically, the grip body 3A is integrally fixed by fastening both ends (fastening ends 3C) of the body frame 3B in the longitudinal direction to the back portion of the seat back 2 with bolts B from the rear side in the drawing. The luggage hook 10 is coupled by fastening, together with a bolt B, a metal bracket 18 thereof for supporting the entire luggage hook 10 to the fastening end 3C of the body frame 3B on the left side in the drawing.

Accordingly, the luggage hook 10 is configured to be provided with rational and excellent load resistance by utilizing the attachment structure in which the assist grip 3 is attached to the back portion of the seat back 2. Here, the fastening end 3C of the body frame 3B on the left side in the drawing to which the bracket 18 is coupled corresponds to the "frame" of the present invention.

Hereinafter, a specific configuration of each part of the luggage hook 10 will be described in detail. As illustrated in FIGS. 5 to 8, the luggage hook 10 further includes a base 13, a rotating shaft 14, a rotary damper 15, and a spring 16 in addition to the hook 11, the bezel 12, and the bracket 18. The hook 11, the bezel 12, and the base 13 are made of resin. The bracket 18, the rotating shaft 14, and the spring 16 are made of metal. The specific materials of the resin and the metal are not particularly limited.

Specifically, the hook 11 is made of glass fiber reinforced plastic (GFRP) and has excellent load resistance. The hook 11 is connected to the base 13 by a rotating shaft 14 extending in the seat width direction (lateral direction) such that the body 11A thereof is rotatable. The hook 11 has the hooking portion 11B protruding in a manner of being bent in a hook shape toward the upper front side from the rear edge of the body 11A in the drawing. In addition, the hook 11 has a closing portion 11C bulging from the upper surface of the body 11A in the drawing.

The closing portion 11C has a shape bulging from the upper surface of the body 11A while facing the hooking portion 11B in the rotation direction. The closing portion 11C has a shape bulging upward in a cylindrical shape from the intermediate portion in the rotation direction to the front edge of the body 11A in the drawing. The hook 11 has a protruding portion 11D further partially protruding upward from the front edge of the closing portion 11C in the drawing.

Figure 9:
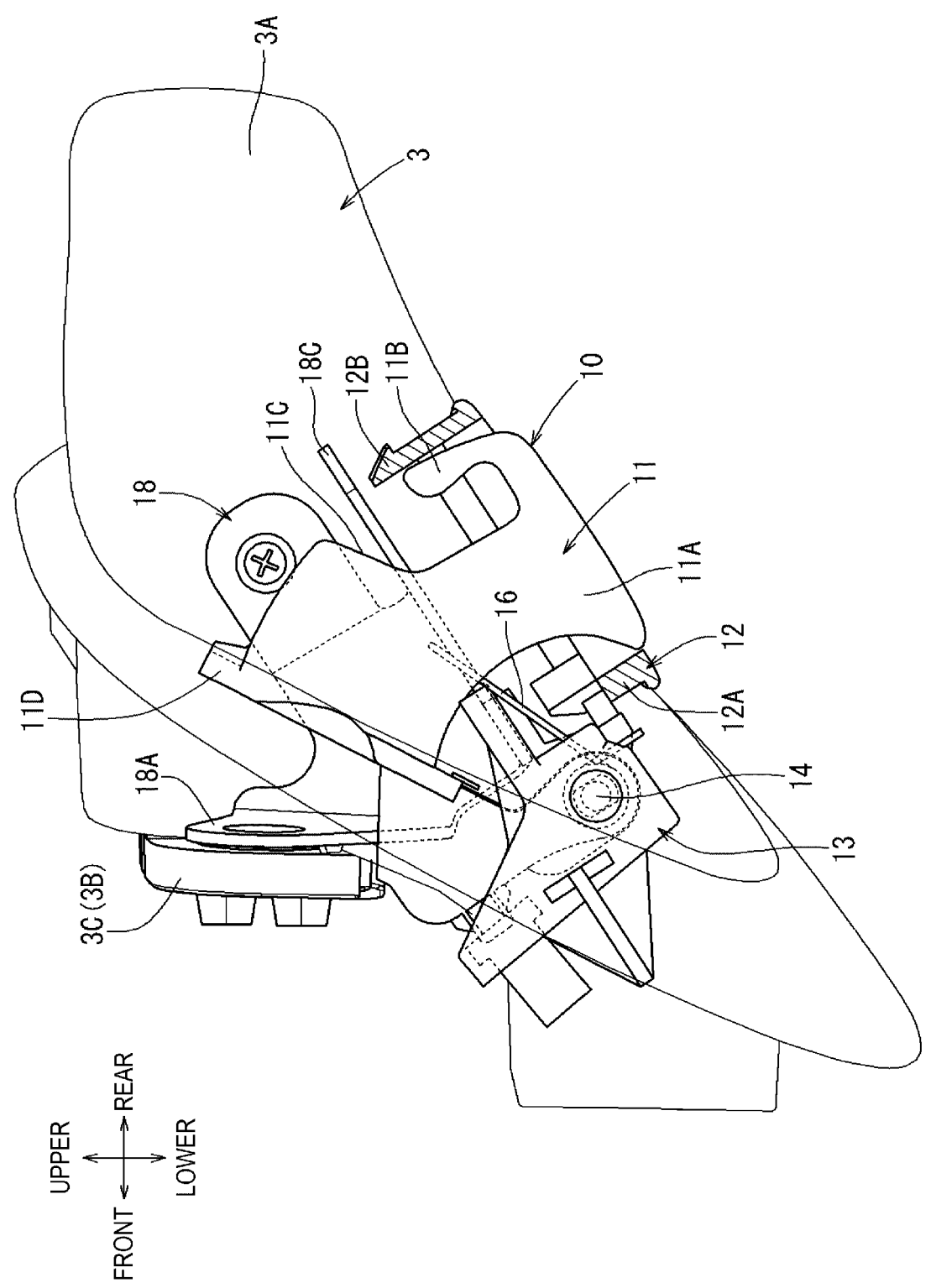
FIG. 9 is a side view illustrating a retracted state of the hook.

As illustrated in FIG. 9, in the hook 11, the rear surfaces of the body 11A and the hooking portion 11B have flat surface shapes flush with each other. Specifically, the rear surface of the hook 11 in the drawing has a flat surface shape of a vertically long rectangular shape capable of being gently fitted into the frame of the bezel 12. When the hook 11 is pushed into the retracted position about the axis of the rotating shaft 14, the rear surface of the hook 11 in the drawing forms a surface flush with the rear surface of the frame 12A in the drawing of the bezel 12, and closes the inside of the frame of the bezel 12 with good appearance with respect to the outside (see FIG. 3).

Figure 10:
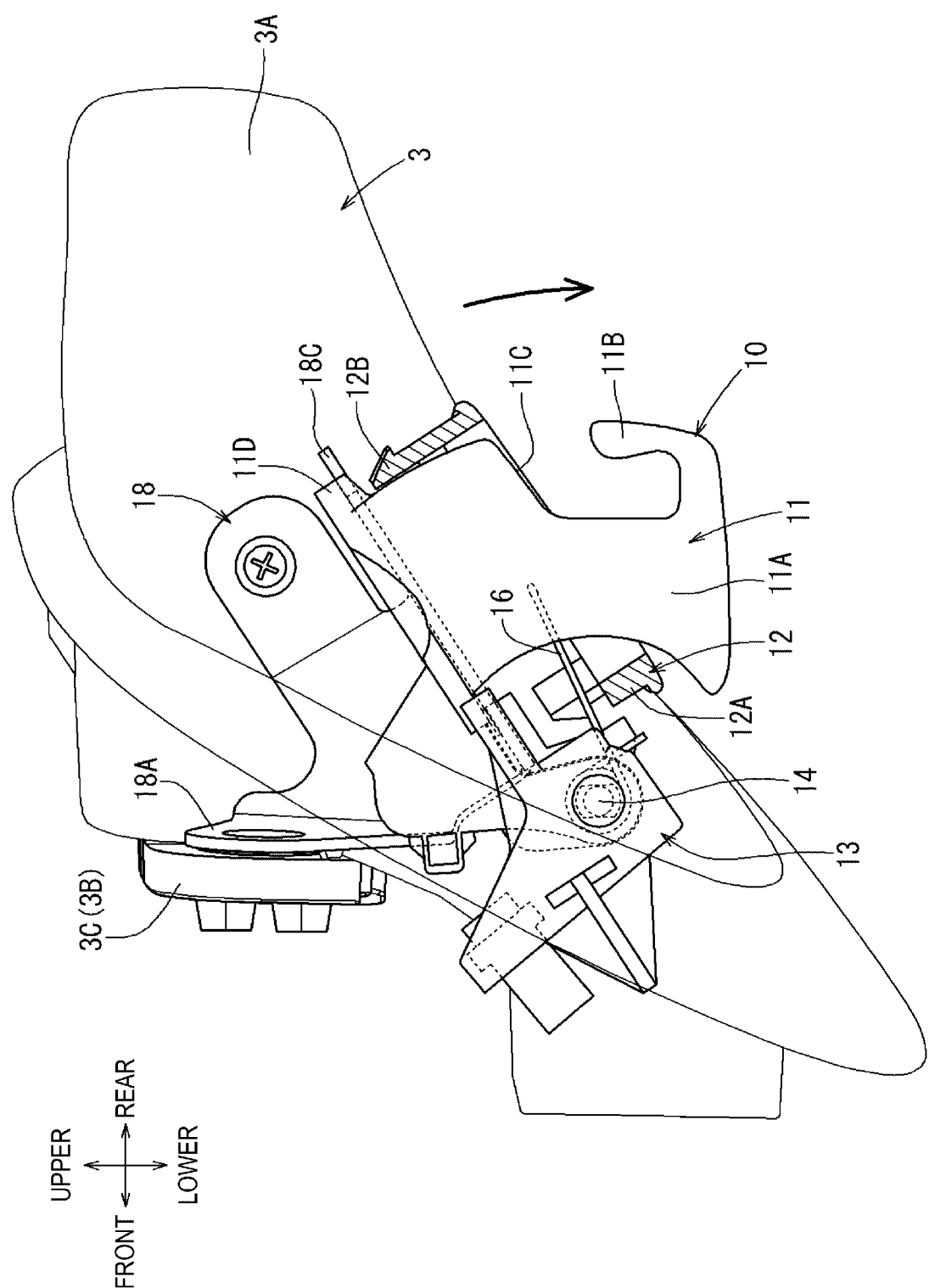
FIG. 10 is a side view illustrating a deployed state of the hook.

As illustrated in FIG. 10, in the hook 11, the rear surface of the closing portion 11C in the drawing has a shape rising in a flat shape toward the upper side in the drawing from the entire region in the seat width direction of the upper surface of the body 11A. When the hook 11 is deployed to the use position about the axis of the rotating shaft 14, the rear surface of the closing portion 11C in the drawing forms a surface flush with the rear surface of the frame 12A in the drawing of the bezel 12, and closes the inside of the frame of the bezel 12 with good appearance with respect to the outside. Accordingly, when the hook 11 is opened to the use position, the rear surface of the closing portion 11C in the drawing closes the inside of the frame of the bezel 12, thereby preventing the inside of the assist grip 3 from being seen from the inside of the frame of the bezel 12 from the outside (see FIG. 2).

When the hook 11 is deployed to the use position illustrated in FIG. 10, the protruding portion 11D is pushed against and locked to a stopping portion 18C of the bracket 18 described later in the rotation direction. When an object is hooked on the hooking portion 11B from the state in which the hook 11 is deployed to the use position, due to the weight of the hooked object, the hook 11 receives a force that pushes the hook 11 in the clockwise direction in the drawing, that is, in a direction in which the hook 11 is further deployed about the axis of the rotating shaft 14.

However, the load applied to the hook 11 is transmitted to the stopping portion 18C of the metal bracket 18 for stopping the rotation of the hook 11 in the deployment direction. Accordingly, the load applied to the hook 11 is more strongly received by the metal bracket 18, instead of by the resin bezel 12 attached around the hook 11.

Figure 6:
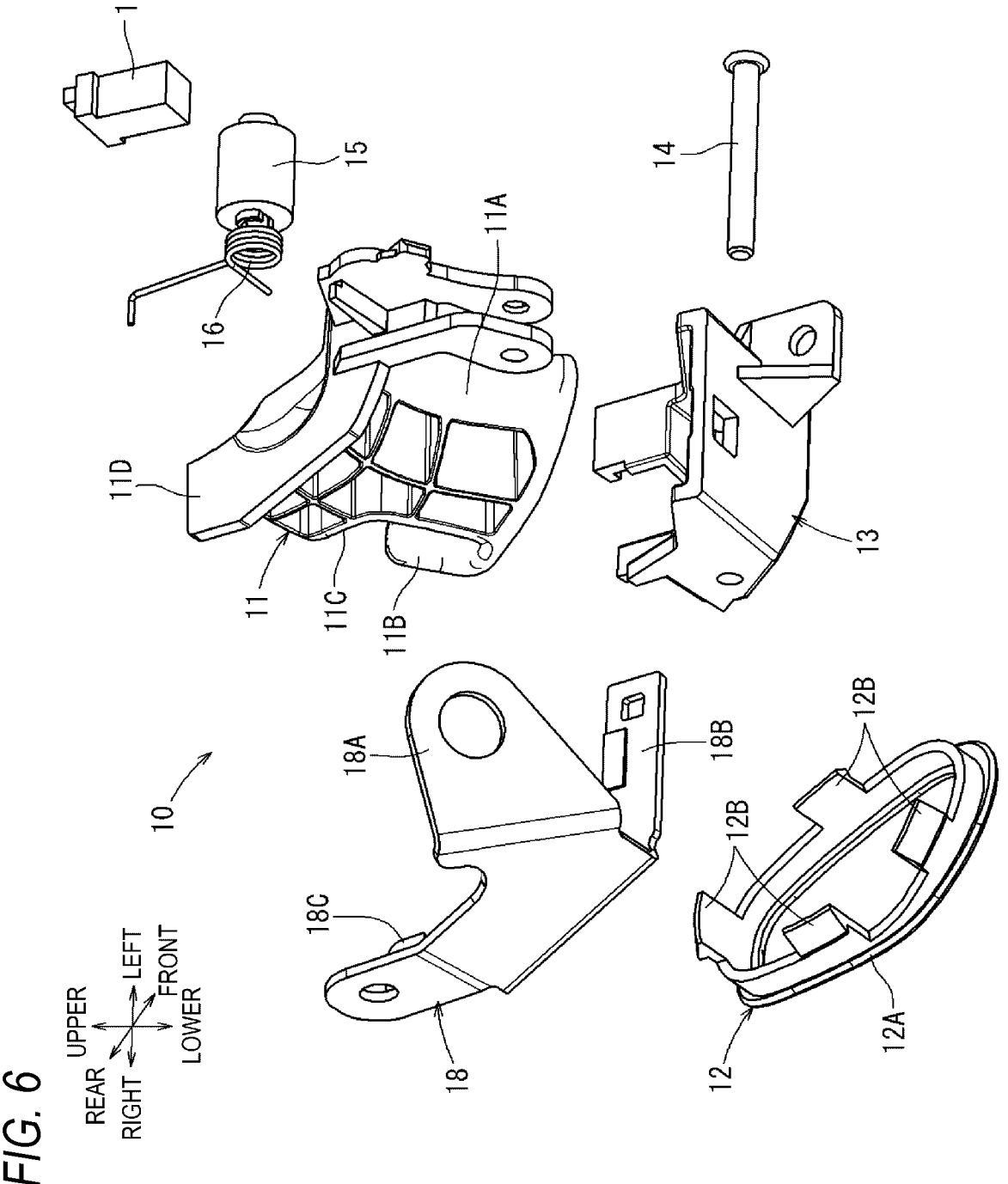
FIG. 6 is an exploded perspective view of FIG. 5 as viewed from the front.
Figure 7:
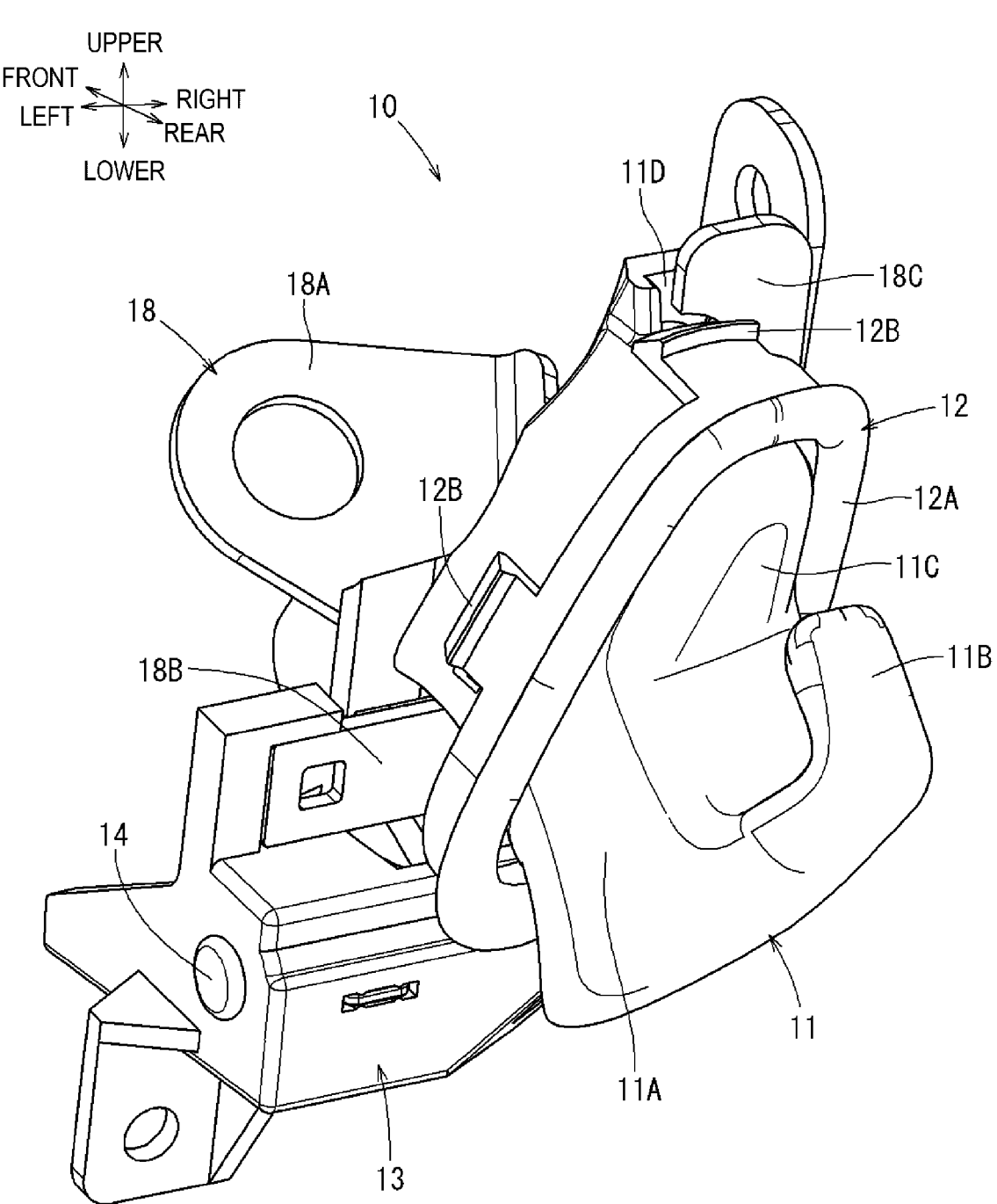
FIG. 7 is a perspective view illustrating the luggage hook alone.

When the hook 11 is pushed into the retracted position illustrated in FIG. 9, the front edge of the body 11A illustrated in the drawing is pressed against the latch 17 installed on the base 13 illustrated in FIG. 6 to engage with the latch 17. As a result, the hook 11 is held at the retracted position against the rotation biasing force in the deployment direction generated by the spring 16 described later.

When the user pushes the rear surface of the hook 11 in the drawing forward from the state in which the hook 11 is held while being engaged with the latch 17 at the retracted position, the hook 11 is disengaged from the engaged state with the latch 17. Accordingly, the hook 11 is deployed to the use position by the rotation biasing force in the deployment direction generated by the spring 16 described later.

Figure 11:
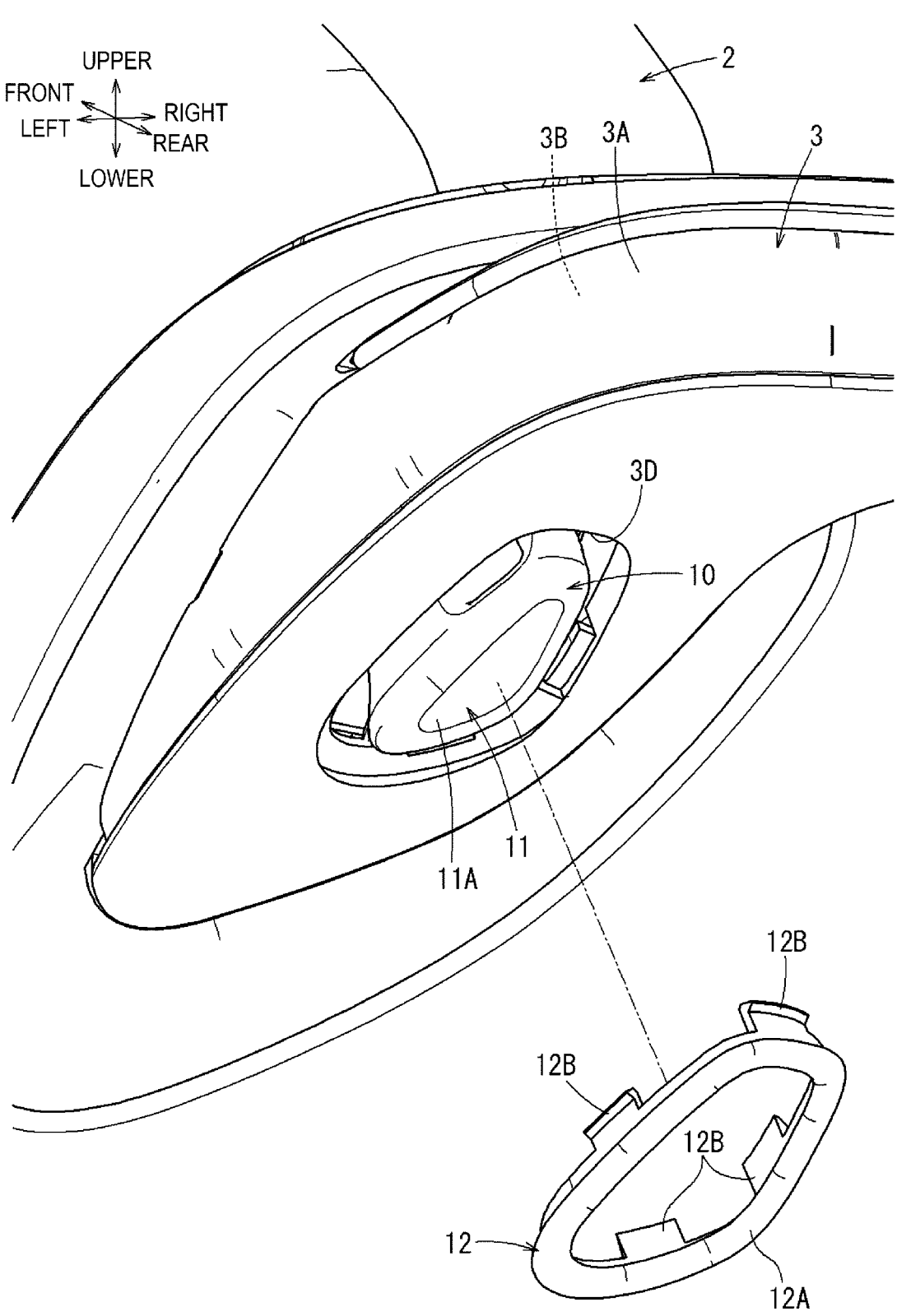
FIG. 11 is an exploded perspective view with a bezel removed.

As illustrated in FIG. 11, the bezel 12 includes a frame 12A having a vertically long frame shape, and arrowhead-shaped fitting claws 12B extending forward from front edges of respective sides of the frame 12A. The bezel 12 is mounted in a state where the frame 12A is fitted along the peripheral edge of a fitting hole 3D formed in the grip body 3A of the assist grip 3 by pushing the frame 12A into the fitting hole 3D from the rear in the drawing.

Specifically, when the frame 12A is pushed into the fitting hole 3D from the rear in the drawing, the fitting claws 12B are snap-fitted to the inner peripheral edge of the fitting hole 3D to integrally mount the bezel 12. Accordingly, the bezel 12 is mounted in a state where the frame 12A is fitted along the peripheral edge of the fitting hole 3D. Accordingly, the bezel 12 surrounds the hook 11 such that the hook 11 is rotated between the use position and the retracted position inside the frame 12A.

Figure 8:
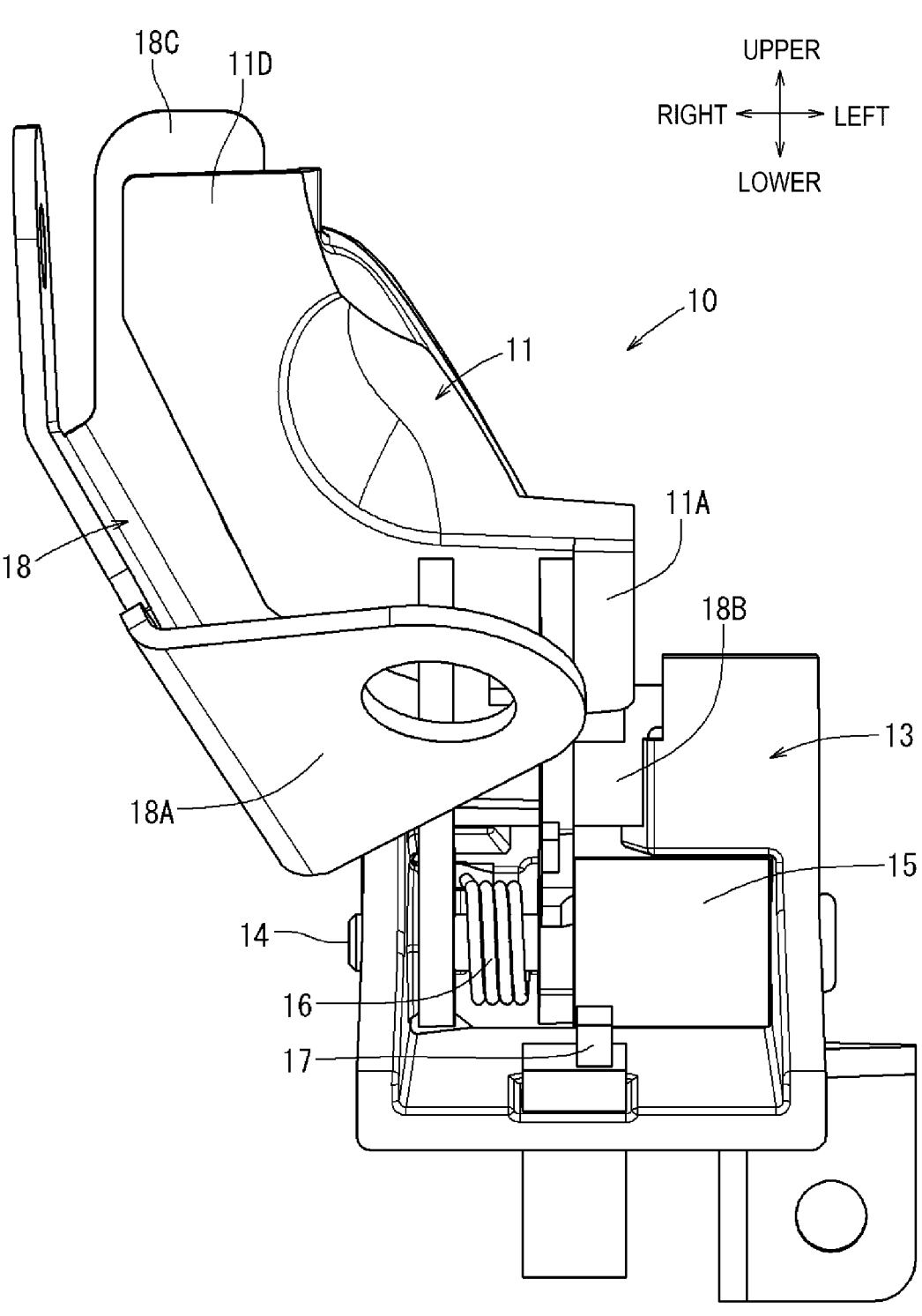
FIG. 8 is a front view of FIG. 7.

As illustrated in FIG. 8, the rotary damper 15 passes through the rotating shaft 14 rotatably coupling the hook 11 to the base 13. The rotary damper 15 is a viscous damper including a so-called one-way clutch. Specifically, the rotary damper 15 is configured to generate a braking force against the relative rotation between an inner cylindrical portion passing through the rotating shaft 14 and an outer cylindrical portion covering the inner cylindrical portion by the viscosity resistance of oil filled between the inner cylindrical portion and the outer cylindrical portion.

In the rotary damper 15, the inner cylindrical portion is fitted with the rotating shaft 14 integrally in the rotation direction, and the outer cylindrical portion is fitted with the base 13 integrally in the rotation direction. Accordingly, as the hook 11 rotates in the deployment direction together with the rotating shaft 14, the inner cylindrical portion rotates with respect to the outer cylindrical portion, and thus the rotation speed of the rotary damper 15 is further limited by the viscosity resistance of the oil filled inside. As a result, the rotational speed of the hook 11 deployed by receiving the rotation biasing force of the spring 16 is appropriately damped, and the hook 11 is deployed with good operation quality.

In the rotary damper 15, when the hook 11 is pushed from the use position to the retracted position, the viscosity resistance of the oil does not act, and the hook 11 may be smoothly pushed to the retracted position against the biasing force of the spring 16. The spring 16 is a so-called coil spring 16, and passes through the rotating shaft 14 together with the rotary damper 15 described above to be in parallel with the rotary damper 15 in the axial direction.

The spring 16 has one end hooked to the body 11A of the hook 11 and the other end hooked to the base 13. Accordingly, the spring 16 is in a state in which a spring force is applied between the base 13 and the hook 11 to constantly bias the hook 11 to rotate about the axis of the rotating shaft 14 in the deployment direction.

Figure 5:
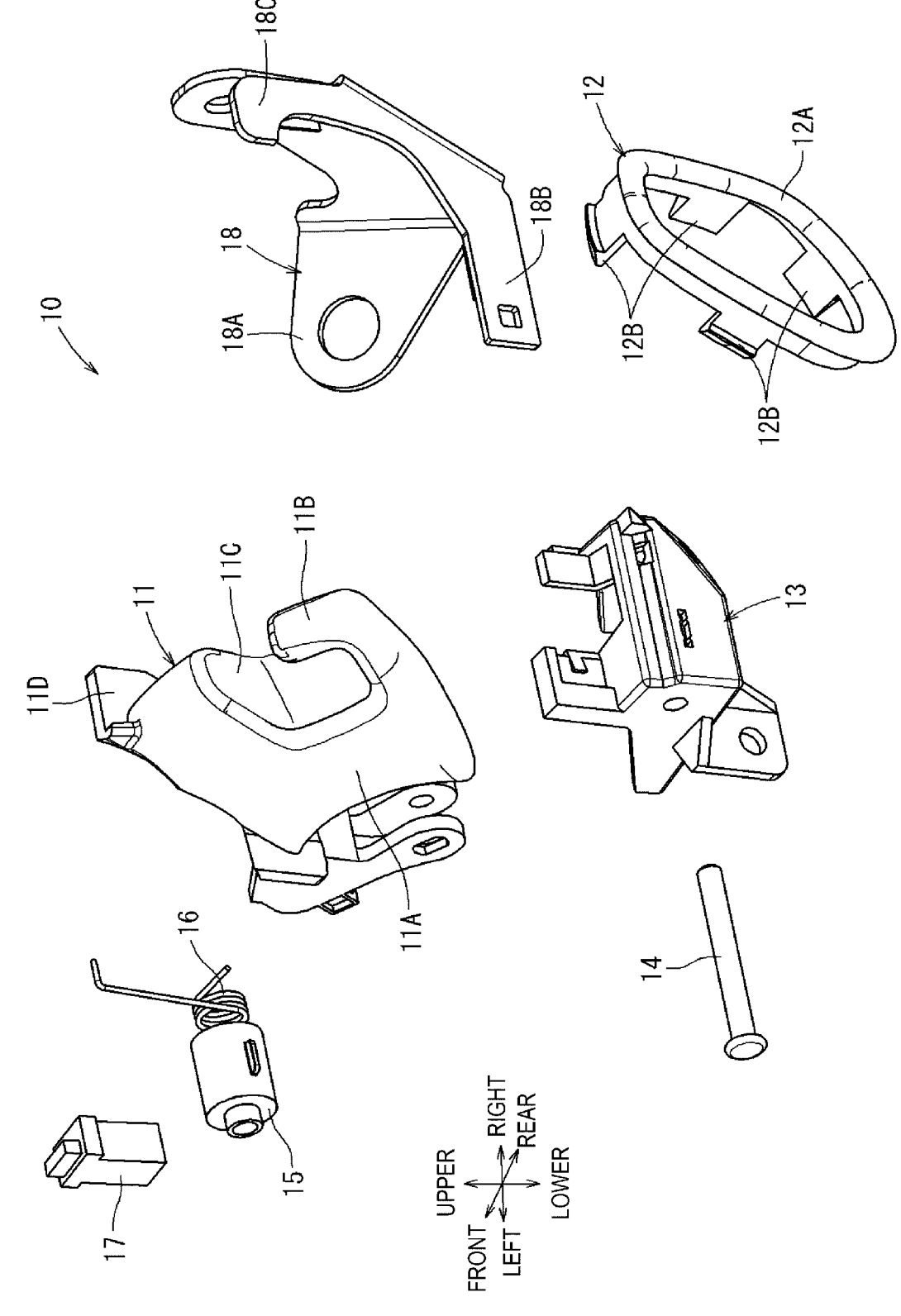
FIG. 5 is an exploded perspective view of the luggage hook.

As illustrated in FIGS. 5 and 6, the bracket 18 is formed from a single metal plate bent by pressing. As illustrated in FIG. 4, the bracket 18 includes a frame fastening portion 18A that is overlapped with the fastening end 3C on the left side of the body frame 3B of the assist grip 3 from the rear side of the drawing to be fastened by the bolt B to the back portion of the seat back 2 together with the fastening end 3C. As illustrated in FIGS. 5 and 6, the bracket 18 includes a supporting portion 18B integrally assembled to the base 13 supporting the hook 11 to support the base 13.

Further, as illustrated in FIG. 10, the bracket 18 includes a stopping portion 18C that abuts against the protruding portion 11D of the hook 11 to stop the rotation of the hook 11 when the hook 11 is deployed to the use position. The stopping portion 18C is bent such that its surfaces face the front and rear directions, and comes into surface contact in the rotation direction with the protruding portion 11D of the hook 11 rotating to the use position, thereby stopping the rotation of the hook 11.

In summary, the luggage hook 10 according to the present embodiment has the following configuration. In the following description, reference signs used in parentheses correspond to the respective configurations described in the above embodiment.

That is, the luggage hook (10) includes: the hook (11) coupled to the interior portion (3) of a vehicle in a manner of being rotatable about the axis extending in the lateral direction; the bezel (12) including the frame fixed to the interior portion (3) to be attached around the hook (11); and the metal stopping portion (18C) joined to the frame (3C) of the interior portion (3) and, at a use position, stops rotation of the hook (11) in the deployment direction protruding from the bezel (12). The direction in which the rotation of the hook (11) is stopped by the stopping portion (18C) is the same as the rotation direction in which the hook (11) is pressed about the axis as an object is hooked at the use position.

The luggage hook (10) may include the hook (11) coupled to the interior portion (3) so as to be rotatable about an axis extending in a lateral direction of the vehicle and movable between a use position and a retracted position, and the metal stopping portion (18C) joined to the frame (3C) of the interior portion (3) and configured to, at a use position, restrict rotation of the hook (11) in a deployment direction along which the hook (11) moves from the retracted position to the use position.

According to the above configurations, the load acting on the hook (11) due to the hooked object is received by the stopping portion (18C) coupled to the frame (3C) of the interior portion (3) to stop the rotation of the hook (11). Accordingly, the load applied to the hook (11) may be strongly received without applying a load to the bezel (12). As a result, the load resistance of the luggage hook (10) may be enhanced.

The hook (11) includes the hooking portion (11B) protruding in a hook shape from the bezel (12) at the use position, and the closing portion (11C) forming a surface flush with the bezel (12) at the use position to close the inside of the frame of the bezel (12). According to the above configuration, when the hook (11) is deployed to the use position, the inside of the frame of the bezel (12) may be appropriately closed with good appearance by the closing portion (11C) of the hook (11), which does not apply a load to the bezel (12).

The luggage hook (10) further includes: the spring (16) for biasing the hook (11) to rotate in the deployment direction with respect to the interior portion (3); and the rotary damper (15) for damping rotation of the hook (11) in the deployment direction with respect to the interior portion (3). According to the above configuration, the spring (16) may hold the hook (11) in an appropriately positioned state without rattling at the use position. In addition, the rotary damper (15) may be deployed with good operational quality while appropriately damping the hook (11) so that the hook (11) is not excessively biased toward the use position.

The interior portion (3) is the assist grip (3) attached to the back portion of the seat back (2) of the vehicle seat (1). The frame (3C) is the fastening end (3C) of the body frame (3B) fastened to the back portion of the seat back (2) of the assist grip (3). According to the above configuration, the luggage hook (10) may be provided with a rational and excellent load resistance by utilizing the attachment structure of the assist grip (3) attached to the back portion of the seat back (2).

Other Embodiments

Although the embodiments of the present disclosure have been described using one embodiment, the present disclosure may be implemented in various forms other than the above embodiment.

1. The luggage hook of the present invention may be attached to the back portion of the seat back of the vehicle seat, instead of to the assist grip attached to the back portion of the seat back. The luggage hook may be attached to a side surface of the seat back or attached to an accessory attached to the back portion of the seat back other than the assist grip, such as a seat back table. The luggage hook may be provided to an interior portion such as a door trim, an instrument panel, or a ceiling portion of the vehicle, instead of the vehicle seat.

2. The metal stopping portion for stopping the rotation of the hook in the deployment direction is only required to be formed from a member coupled to the frame of the interior portion. The member may be joined to the frame by a method other than fastening using bolts, such as welding or caulking. The contact position of the stopping portion is not particularly limited as long as the stopping portion is configured to stop the rotation of the hook in the deployment direction at the use position in the rotation direction.

For example, the stopping portion may be configured to stop the rotation of the hook at a position aligned with the rotation center of the hook in the height direction or at a higher or lower position. In addition, the stopping portion may be configured to stop the rotation of the hook at a position aligned with the rotation center of the hook in the front-rear direction or at a position forward or rearward. The stopping portion may be configured to stop the rotation of the hook by abutting against a portion protruding from a side portion of the hook, instead of being configured to stop the hook at a position farthest from the rotation center thereof in the radial direction.

What is claimed is:

1. A seat structure comprising:
an assist grip including a body frame having fastening ends at both ends in a longitudinal direction of the body frame, the body frame being fixed by fastening the fastening ends of the body frame to a back portion of a seat back of a vehicle seat with bolts; and
a luggage hook provided on the back portion of the seat back of the vehicle seat, the luggage hook including:

a hook configured to be coupled to the back portion of the seat back of the vehicle seat so as to be rotatable about an axis extending in a lateral direction of a vehicle;
a bezel including a frame configured to be fixed to the back portion of the seat back of the vehicle seat and to be attached around the hook; and
a metal bracket including a stopping portion configured to, at a use position, stop rotation of the hook in a deployment direction protruding from the bezel,
wherein the stopping portion is configured to stop the rotation of the hook about the axis at the use position, in conjunction with a hooking of an object,
wherein the metal bracket is joined to one of the fastening ends of the body frame of the assist grip with one of the bolts, and
wherein the metal bracket and the one of the fastening ends of the body frame of the assist grip are fastened together to the back portion of the seat back of the vehicle seat with the one of the bolts penetrating both the metal bracket and the one of the fastening ends of the body frame of the assist grip, such that the one of the fastening ends of the body frame of the assist grip is interposed between the metal bracket and the back portion of the seat back of the vehicle seat.

2. The seat structure according to claim 1, wherein the hook includes, at the use position:
a hooking portion protruding from the bezel and having a hook shape; and
a closing portion forming a surface flush with the bezel to close an inside of the frame of the bezel.

3. The seat structure according to claim 1 further comprising:
a spring configured to bias the hook to rotate in the deployment direction with respect to the back portion of the seat back of the vehicle seat; and
a rotary damper configured to damp rotation of the hook in the deployment direction with respect to the back portion of the seat back of the vehicle seat.

4. The seat structure according to claim 1, wherein
a tip of the stopping portion is wider than a base of the stopping portion.

5. The seat structure according to claim 1, wherein
the assist grip extends in the lateral direction of the vehicle and the fastening ends are provided at both end portions of the assist grip in the lateral direction of the vehicle,
the luggage hook is incorporated in one of the end portions of the assist grip, and
the hook protrudes from a lower surface of the assist grip in the use position.

6. A seat structure comprising:
an assist grip including a body frame having fastening ends at both ends in a longitudinal direction of the body frame, the body frame being fixed by fastening the fastening ends of the body frame to a back portion of a seat back of a vehicle seat with bolts; and
a luggage hook provided on the back portion of the seat back of the vehicle seat, the luggage hook including:
a hook configured to be coupled to the back portion of the seat back of the vehicle seat so as to be rotatable about an axis extending in a lateral direction of a vehicle and movable between a use position and a retracted position;
a metal bracket including a stopping portion configured to, at the use position, restrict rotation of the hook in a deployment direction along which the hook moves from the retracted position to the use position, wherein the metal bracket is joined to one of the fastening ends of the body frame of the assist grip with one of the bolts, and wherein the metal bracket and the one of the fastening ends of the body frame of the assist grip are fastened together to the back portion of the seat back of the vehicle seat with the one of the bolts penetrating both the metal bracket and the one of the fastening ends of the body frame of the assist grip, such that the one of the fastening ends of the body frame of the assist grip is interposed between the metal bracket and the back portion of the seat back of the vehicle seat.

* * * * *